`United States Patent Office`

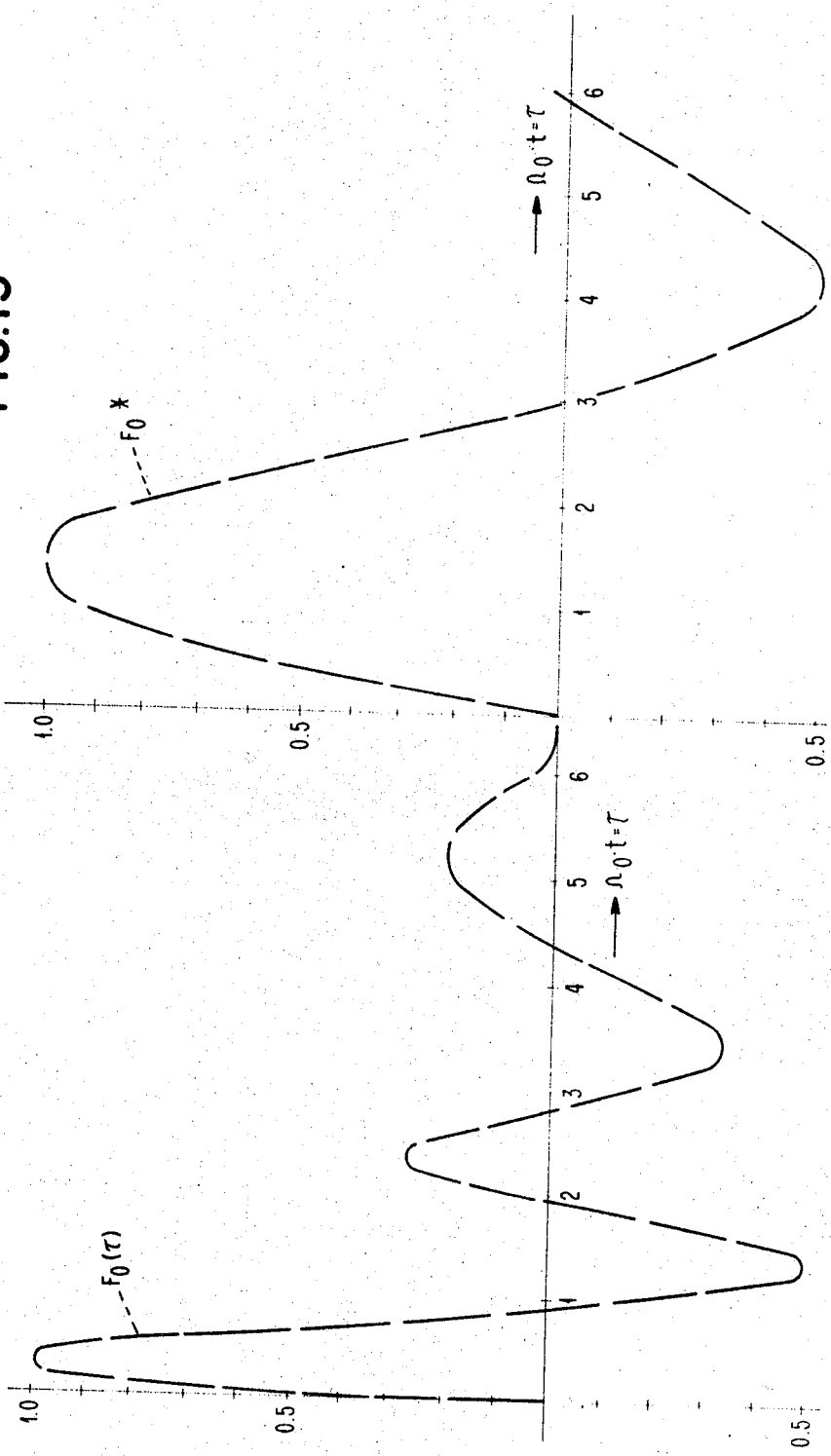

3,450,840
Patented June 17, 1969

3,450,840
MULTIPLEX DATA TRANSMISSION SYSTEM USING ORTHOGONAL TRANSMISSION WAVEFORMS
Edwin Vogt, Hartsdale, N.Y., assignor to International Business Machines Corporation, Armonk, N.Y., a corporation of New York
Filed Nov. 19, 1965, Ser. No. 508,769
Int. Cl. H04j 1/02, 3/04; H04b 7/00
U.S. Cl. 179—15                               3 Claims

ABSTRACT OF THE DISCLOSURE

Apparatus for multiplex transmission of data wherein the transmitting apparatus includes a set of filters chosen so their characteristic responses to excitation by unit impulses provide a set of orthogonal transmission waveforms. A gate circuit is associated with each filter so that during each transmission interval, combinations of waveforms are selected under control of data presented at the corresponding input channels. The selected waveforms are then superimposed to form a composite signal for transmission to the receiving apparatus. The receiving apparatus includes a distributor having one output for each channel. Each of the outputs is connected to an evaluation circuit, each of which is responsive to the presence or absence of a separate one of the orthogonal transmission waveforms.

---

This invention relates to multiplex digital data transmission systems wherein each channel is represented by one member of a finite set of highly distinguishable transmission waveforms. More particularly, this invention relates to data transmission systems wherein each transmission waveform is defined by the characteristic response of a filter to excitation by a unit impulse, the derivative of such a response, or a combination of such derivatives.

Convention digital data transmission systems generally employ analog techniques for the transmission of signals. In such data transmission systems, the rectangular digital waveforms, such as are used in digital computers, serve to modulate a carrier wave by means of well known amplitude, frequency, or phase modulation techniques. At the receiver a suitable analog demodulator operates on the modulated carrier wave to recover the original rectangular waveform as accurately as possible. Such data transmission systems are subject to the disadvantage that the digital waveforms which are finally reproduced at the output of the receiver are affected not only by the actual digital information transmitted, but also by the instantaneous phase difference between the carrier and the system clock, as well as on the detailed filter characteristics of all the filters in the transmission channel, and on random noise.

Data transmission systems using truly digital transmission techniques possess certain advantages over the prior art systems. In such systems, the rectangular digital waveforms serve to select members of a predetermined finite set of highly distinguishable transmission waveforms. The pre-knowledge of the characteristics of each member of the set of transmission waveforms can be used to design receiving apparatus including a set of optimum detection devices or evaluation circuits, each of which is responsive to only one member of the set of transmission waveforms. Hence, in spite of the fact that the predetermined transmission waveforms are subject to the inevitable distortion and random noise factors, each evaluation circuit is capable of making the simple decision as to whether it is more probable than not that its associated transmission waveform was received during a particular transmission interval. This capability is most pronounced when the members of the set of transmission waveforms are most highly distinguishable from each other. A set of waveforms, in which each waveform is completely independent from all other waveforms in the set and in which the integral of the product of any two waveforms in the set is equal to zero, is known as a set of orthogonal waveforms. Hence the use of orthogonal waveforms in combination with optimum detection devices would be expected to deliver superior performance.

The properties of orthogonal waveforms recommend them for use in multiplex digital data transmission systems. In such systems means are provided at the transmitting side for generating a set of orthogonal waveforms, each waveform corresponding to a separate input channel. During each time interval, combinations of waveforms are selected in response to input information, and the selected waveforms are superimposed for transmission. Owing to their orthogonality properties the superimposed waveforms may be separated into their corresponding output channels by means of a set of optimum detection devices or evaluation circuits each of which is responsive to only one waveform.

A chief obstacle to the full exploitation of the benefits of such multiplex digital data transmission systems has been the difficulty and expense of generating suitable sets of orthogonal transmission waveforms. Moreover, prior attempts to generate such waveforms have usually resulted in waveforms having sharp discontinuities which are undesirable because they require transmission channels of very large bandwidth in order to avoid serious distortions.

It is therefore an object of this invention to provide an improved data transmission system using sets of orthogonal transmission waveforms.

It is also an object of this invention to provide improved means for generating sets of orthogonal waveforms which have modest channel bandwidth requirements It is a further object of this invention to provide improved means for detecting and evaluating sets of orthogonal transmission waveforms.

In accordance with the above objects, my invention generally provides a system for multiplex transmission of data which is presented at the input in the form of an $n$-position binary code. In one embodiment of my invention the transmitting apparatus includes a set of $n$ filters chosen so that their characteristic responses to excitation by unit impulses provide a set of orthogonal transmission waveforms. A gate circuit is associated with each filter so that during each transmission interval combinations of waveforms are selected under control of the data presented at the corresponding input positions or channels. The selected waveforms are then superimposed so as to form a composite signal for transmission to the receiving apparatus which includes a distributor having $n$ outputs leading to $n$ evaluation circuits, each of which is responsive to the presence or absence of a separate one of the orthogonal transmission waveforms. The received data is thus recovered in binary form at the outputs of the evaluation circuits.

In accordance with an alternate embodiment of my invention, the means for producing the orthogonal transmission waveforms may comprise an impulse generator for producing the unit impulses, and a single filter which supplies a basic signal in response to the impulses. The output from this filter is then fed into a system of differentiating amplifiers and adding amplifiers which produces a set of orthogonal waveforms made up of derivatives and combinations of derivatives of the basic signal.

In addition, in accordance with another embodiment of my invention each evaluation circuit includes a filter which is identical to one of the filters at the transmitting side.

The output of this filter is applied together with the received composite signal to a multiplying and integrating amplifier. If the characteristic waveform associated with the filter is present in the composite signal, the output of the multiplying and integrating device will exceed a certain level causing a bistable threshold device to be set. If the characteristic waveform is not present in the composite signal the threshold level will not be reached. Hence the condition of the bistable threshold device indicates the data received in the position or channel associated with the particular orthogonal transmission waveform.

In accordance with a further embodiment of my invention each evaluating circuit includes a filter which is matched to one of the orthogonal transmission waveforms in such a way that an output of a certain threshold level appears when that particular transmission waveform is applied to the filter input. When any other orthogonal waveform is applied to the filter input, a zero output appears. Hence the filter output can be used to operate a bistable threshold circuit indicative of the data received.

Further, for the purpose of timing the production of the orthogonal transmission waveforms at the transmitting side and the evaluation thereof at the receiving side, my invention provides a synchronizing device for producing a synchronizing signal at the transmitting side. This signal is encoded into a waveform conforming to the orthogonality property of the message waveforms and is transmitted to the receiving side. The synchronizing signal is also fed into the unit impulse generator so that the orthogonal message waveforms are transmitted at a definite time interval after the directly transmitted synchronizing signal. At the receiving side, the synchronizing signal is received in the allotted channel and the unit impulse is derived therefrom in order to produce correctly timed orthogonal waveforms in the filters of the evaluation circuits.

In the alternative type of evaluation where the signals simply pass through filters and are investigated as to whether they have a zero or a certain threshold value at a particular time, it is of advantage to derive the particular instant for evaluation from the received synchronizing signal.

An advantage of my invention is in providing a multiplex data transmission system which is relatively simple and inexpensive to build.

Another advantage of my invention is in providing a multiplex data transmission system which is reliable in its transmission properties and which requires less transmission channel bandwidth than previous systems.

Other objects and advantages of my invention will be pointed out in the following description and illustrated in the accompanying drawings which disclose, by way of example, the principle of the invention and the best modes which has been contemplated of applying that principle.

FIGS. 10 to 13 depict various transmission waveforms as functions of time.

To prepare them for transmission, both the data and the synchronizing signals are encoded into analog transmission waveforms. These transmission waveforms should be selected so that they are distorted as little as possible in the transmission channel, assuming optimum bandwidth for this purpose. At the transmitting side, a group of analog transmission signals representative of an $n$-bit group of data is transmitted simultaneously. At the receiving side this composite signal is re-converted into the digital $n$-bit group. Thus for each channel, a characteristic analog transmission waveform is required.

The only limitation to which the characteristic analog transmission waveforms must be subjected is that they must be so constituted that they can be separated from each other again at the receiving side. This is the case when these waveforms are orthogonal to each other over the time interval $0 \leq t \leq \infty$. If the waveforms decay within a time T, this is synonymous with orthogonality in the time interval $0 \leq t \leq T$. Here, orthogonality means that in the interval $0 \leq t \leq T$, if two identical waveforms are multiplied with each other and integrated, the integral has the value $b$, but if two orthogonal waveforms are multiplied together and integrated, the integral has the value 0.

(1) $$\int_0^T T_{F_x}(t) \cdot F_y(t) \cdot dt = \begin{matrix} 0 \text{ for } x \pm y \\ b \text{ for } x = y \end{matrix}$$

Particular advantages result from the fact that it is possible to establish sets of orthogonal transmission waveforms which have no direct-current components. In other words, such waveforms manifest high-pass or bandpass characteristics and are notably undemanding with regard to their bandwidth.

Figure 3:
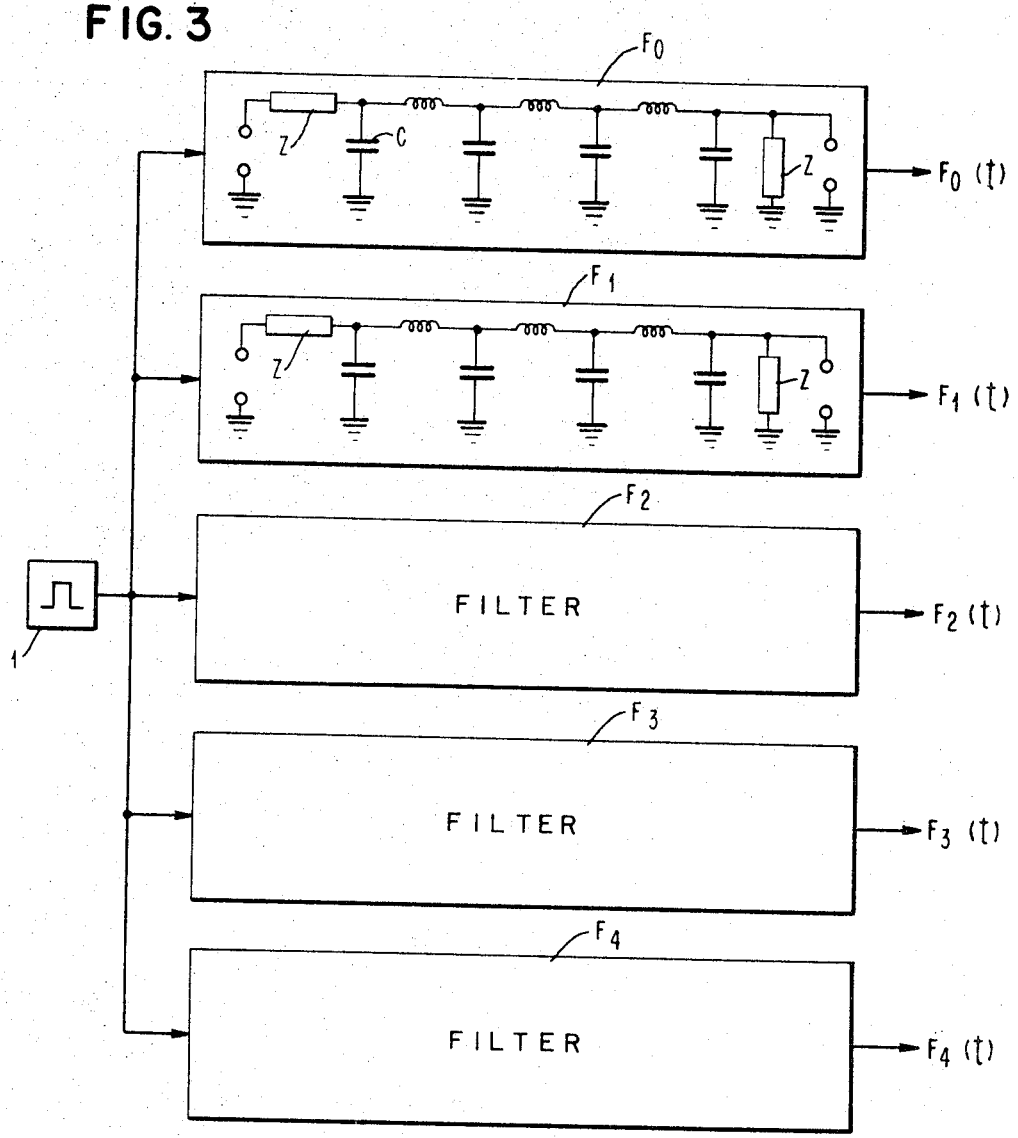
FIG. 3 shows a block diagram of an arrangement for producing the orthogonal transmission waveforms using LC-filters.
Figure 4:
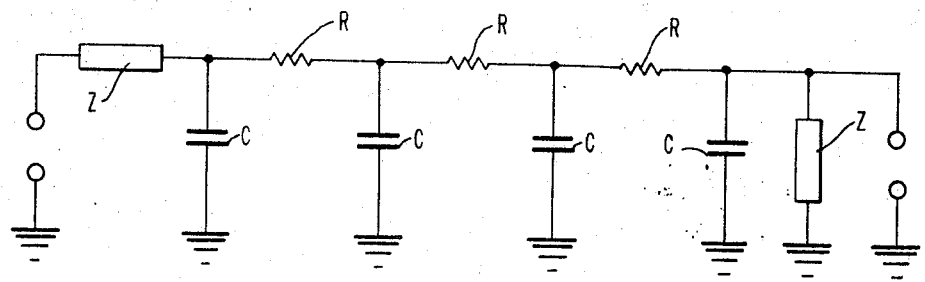
FIG. 4 shows an RC-filter.

One technique for generating suitable sets of orthogonal transmission waveforms is illustrated in FIG. 3. Each analog transmission waveform requires its own filter network $F_0$ to $F_4$ which is connected via a multiple line with the impulse generator 1 which delivers the unit impulse for exciting the characteristic responses of the filters. The filters shown in FIG. 3 are relatively low loss LC-filters which are matched to the input and output lines by means of the characteristic impedances Z. Since these LC-filters are expensive to manufacture, it is in many cases of advantage to use RC-filter networks, but these are subject to heavier losses. Such an RC-filter is illustrated in FIG. 4. Here again, the input and output are matched to the lines with the impedance Z.

Figure 5:
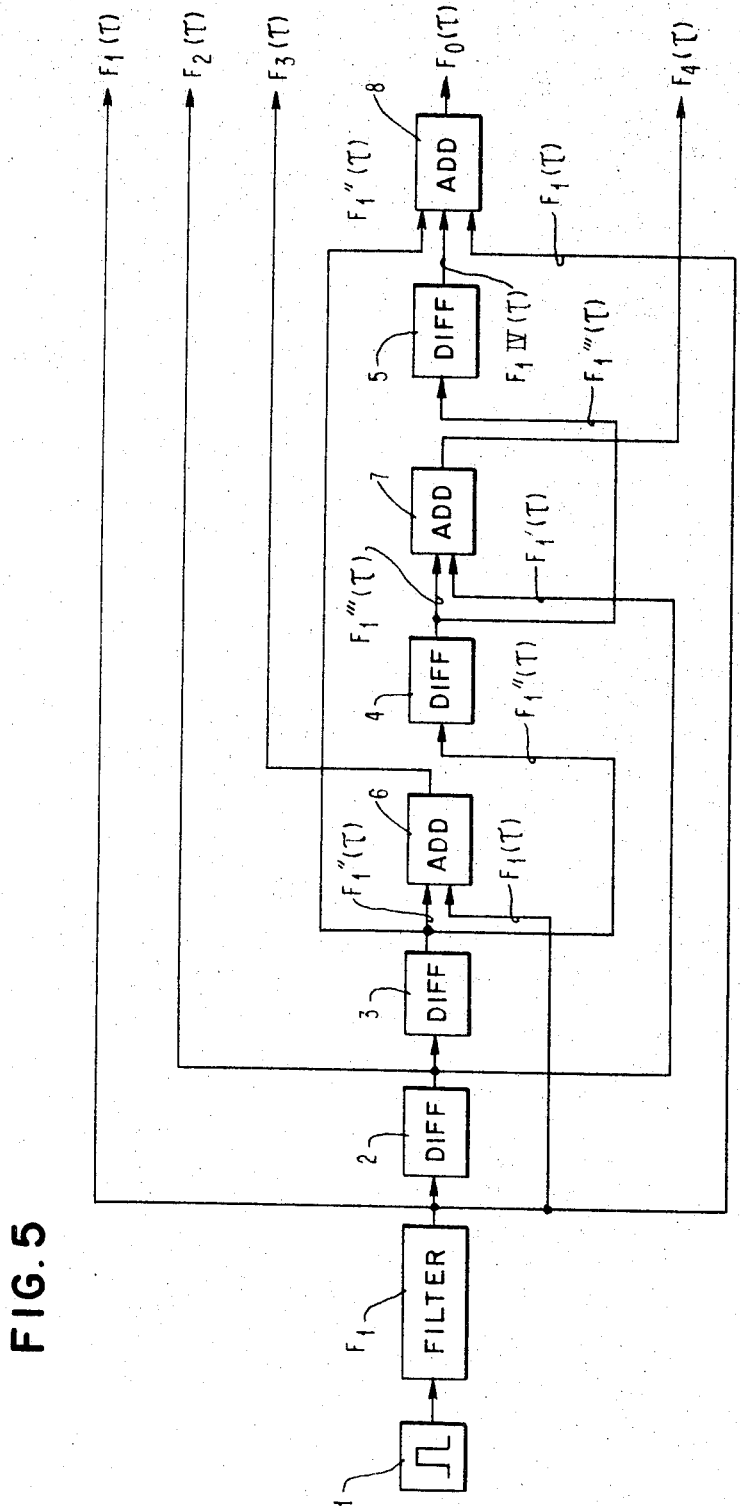
FIG. 5 shows a block diagram of a system for producing orthogonal transmission waveforms by means of differentiating and adding amplifiers.

Another technique for generating the orthogonal transmission waveforms is illustrated in FIG. 5. This provides a single filter $F_1$ from which the synchronizing and data signals $F_0(t)$ to $F_4(t)$ are obtained by multiple differentiation and linear superimposition of different functions derived from the function $F_1(t)$ produced by means of the filter $F_1$. The differentiating and adding amplifiers 2 to 5 and 6 to 8 consist of relatively simple switching circuits whose cost is far below that of a pure filter arrangement.

Figure 11:
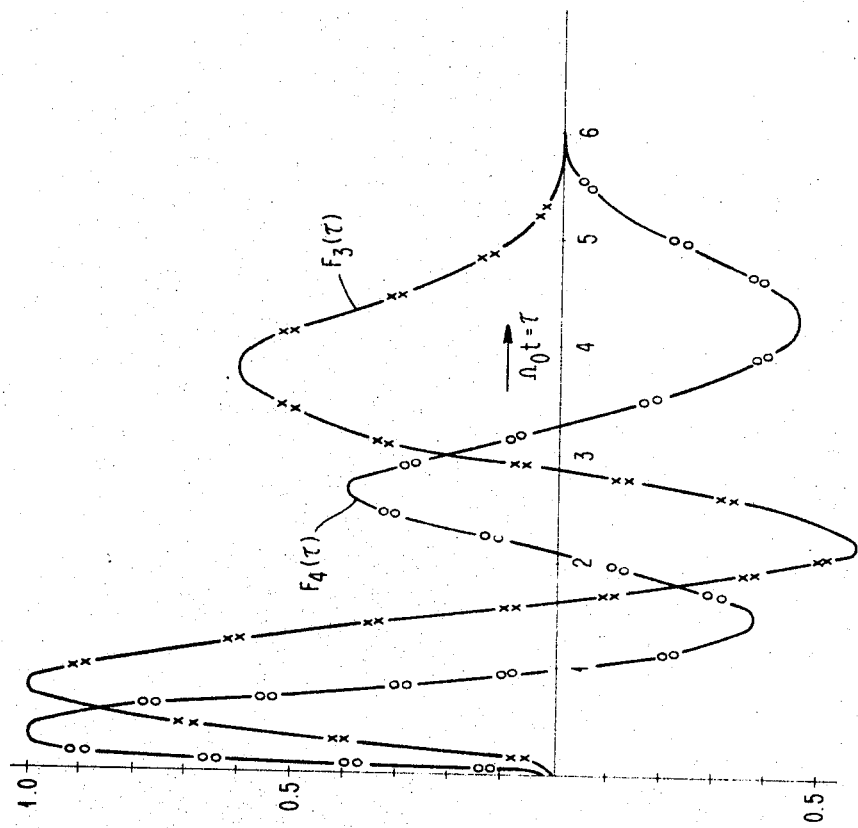
Figure 10:
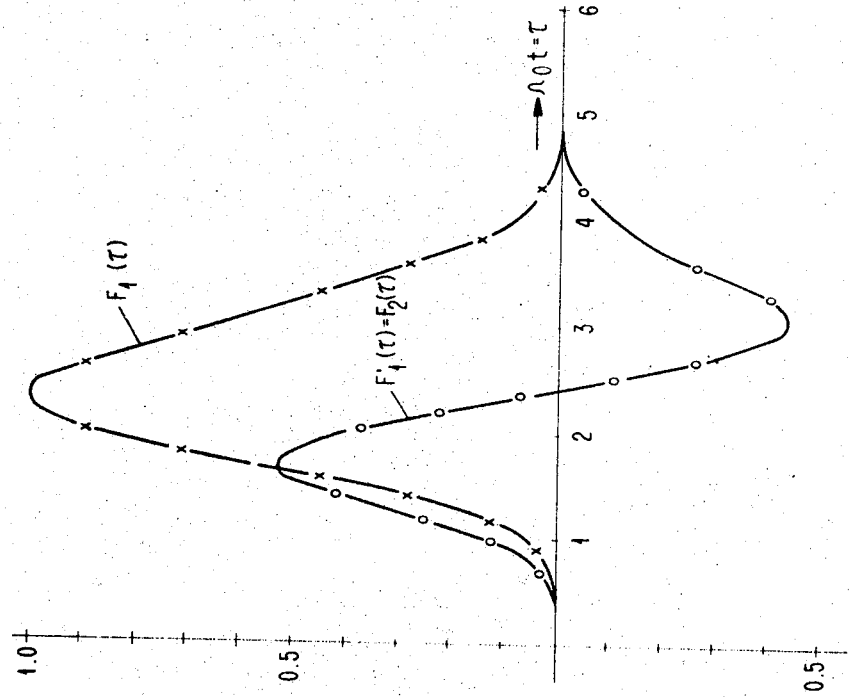

More particularly, a time-varying analog waveform $F_1(t)$ is created by means of the impulse generator 1 and the filter $F_1$ of FIG. 5. This signal is already the first analog signal obtained for representing a data channel. By differentiation of this signal in the differentiating amplifier 2, the second waveform $F_2(t) = F'_1(t)$ is obtained. The third waveform $F_3(t)$ which fulfills the orthogonality condition, is created by linear superimposition of the signal $F_1(t)$ with the signal $F''_1(t)$ which has been formed by further differentiation of signal $F_2(t)$ in the differentiating amplifier 3. The linear superimposition is brought about by means of the adding amplifier 6. The fourth analog signal $F_4(t)$ for representing the fourth data channel, results from linear superimposition of the signal $F_2(t)$ with the signal $F'''_1(t)$ which has been derived by differentiating the signal $F''_1(t)$ in the differentiating amplifier 4. The respective adding amplifier has the designation 7. For the purpose of synchronization for example, it is possible to use the signal $$F_0(t) \equiv c_0 F_1(t) + c_2 F''_1(t) + c_4 F^{IV}_1(t)$$

which is obtained in the manner already explained by means of the further differentiating amplifier 5 and adding amplifier 8. The waveforms generated by the circuit of FIG. 5 are shown as functions of time in FIGS. 10, 11, and 12. FIG. 13 shows a waveform which is deemed to be particularly suitable for use in the synchronization function described below.

Figure 1:
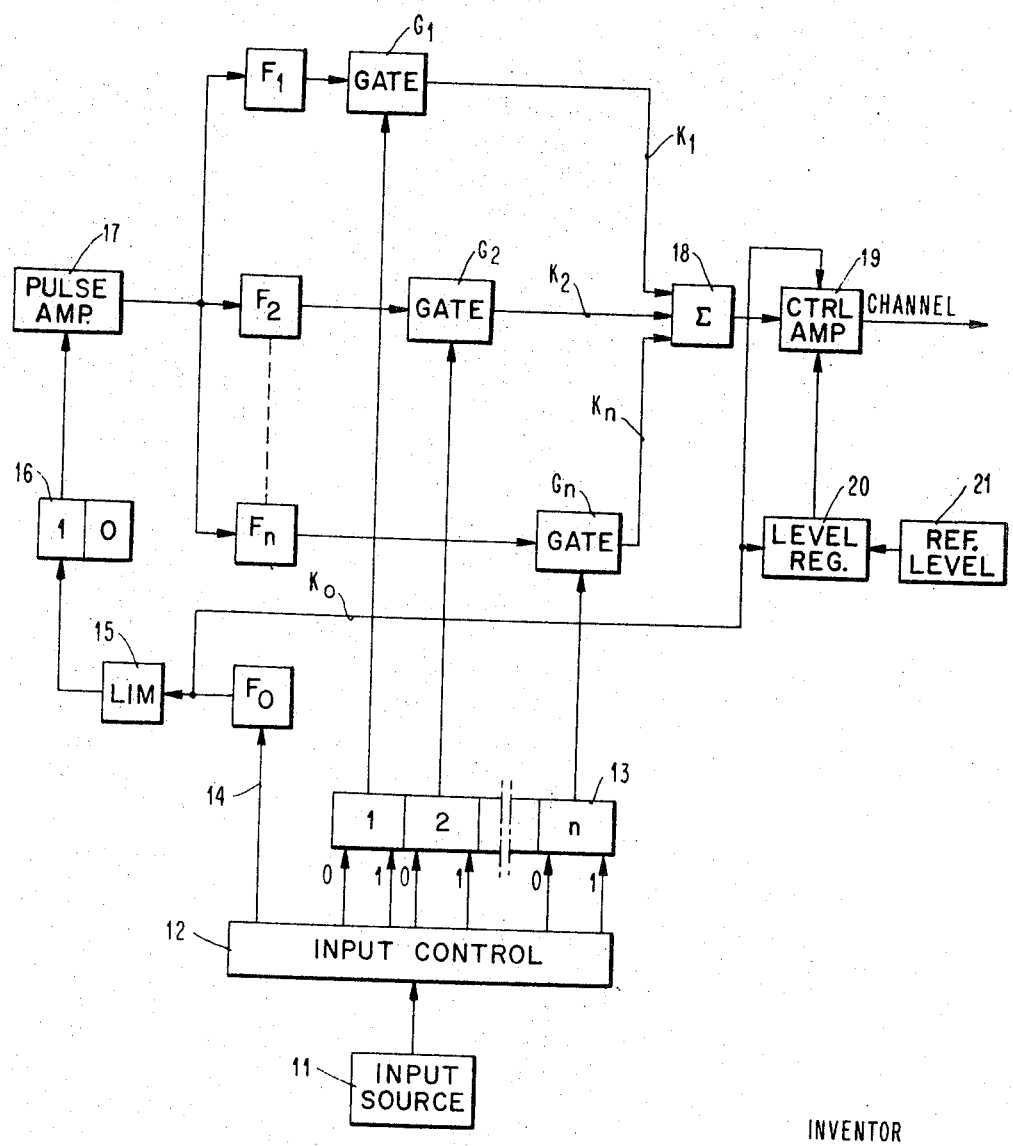
FIG. 1 shows a block diagram of the circuit arrangement at the transmitting side.
Figure 6:
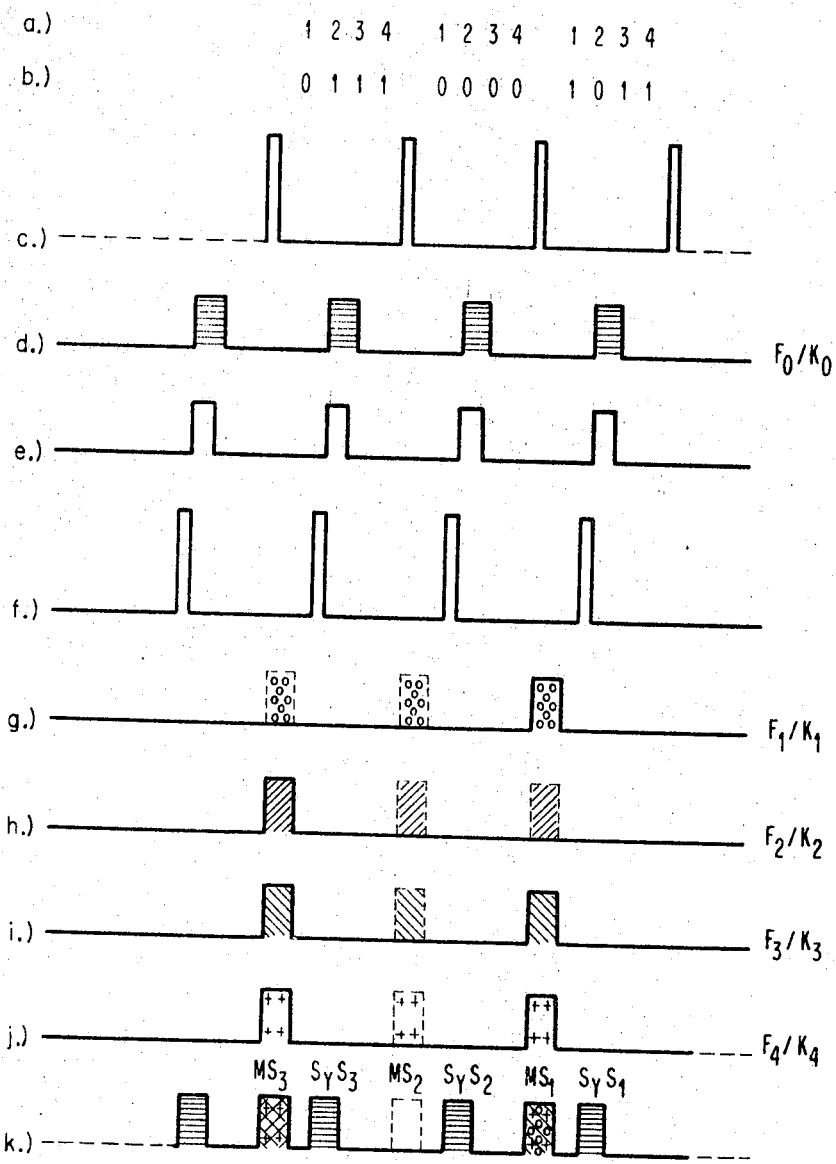
FIG. 6 shows timing diagrams for explaining the operation of the circuit of FIG. 1.

Referring to the block diagram of the transmitting side shown in FIG. 1, the message is delivered, via an input control 12 to an input register 13 for intermediate storing. For purposes of illustration, FIG. 6a represents four positions of the input register 13. FIG. 6b shows the data stored in these positions during three hypothetical cycles of operation. When the message to be transmitted has arrived completely in the input register 13, a unit impulse shown in FIG. 6c is produced by an impulse generator which is not especially shown but which is incorporated in the input control 12. This pulse is transmitted via line 14 to the filter $F_0$ which generates a synchronizing signal indicated schematically in FIG. 6d as an impulse reaction. Through the design of the filter $F_0$ the characteristics of the synchronizing signal waveforms are tailored so that during transmission over the transmission channel, its attenuation and distortion are approximately of the same quantity as the attenuation and distortion of the message signals. This is of particular importance if the synchronizing signal is also to be used for level control.

The synchronizing signal produced by the filter $F_0$ in response to the unit impulse is also used to time the release of the waveforms from the filters $F_1$ to $F_n$ to the data channels $K_1$ to $K_n$ shown in FIG. 1. The limiter 15 rectifies and limits the synchronization signal to a level suitable for input to the succeeding monostable multivibrator 16. The limited signal then triggers circuit 16 which, delivers a precisely timed output pulse as shown in FIG. 6e. By proper choice of the delay effects in circuit 16, the timing of the release of the orthogonal transmission waveforms from filters $F_1$ to $F_n$ may be adjusted as desired.

The succeeding impulse generator or amplifier 17 is responsive to the pulses from the monostable multivibrator 16 to produce the unit impulses shown in FIG. 6f. For example, impulse amplifier 17 may comprise a pulse generator whose pulse width T is smaller, by at least the factor 10, than the reciprocal of the limiting frequency of the filters and of the transmission channel ($T < 1/10 f_{max}$). The unit impulse is transmitted in parallel to the data channel filters $F_1$ to $F_n$ which then deliver, as impulse reaction, the analog waveforms characteristic of them. For purposes of illustration only, FIGS. 6g to 6j represent the analog waveforms as rectangles with different patterning, so that their later linear superimposition can be represented in easily visible form. Examples of the actual analog waveforms are shown in normalized form in FIGS. 10 to 13.

Gate circuits $G_1$ to $G_n$ follow the channel filters $F_1$ to $F_n$. For example, each gate circuit may comprise a linear amplifier which can be turned "on" or "off" in response to the bit, 1 or 0, contained in each position 1 to $n$ of the input register. When the gate circuits $G_1$ to $G_n$ are opened, the analog waveforms characteristic of each channel $K_1$ to $K_n$ pass to summation circuit 18, in which they are superimposed. The construction of this summation circuit may be conventional and may be based on well known analog computer technology.

The output signals from the summation circuit are delivered to a control amplifier 19 which has two inputs. One input is connected with the above-mentioned summation circuit and the second input is connected to channel $K_0$, which carries the synchronizing signal. Both the message and the synchronizing signals are amplified by amplifier 19, to the level necessary for transmission.

If the level of the synchronizing signal is precisely controlled, it may be used for level regulation. As shown in FIG. 1, a level regulation device 20 is provided for this purpose. Level regulation device 20 supplies a control signal to the control amplifier 19, when a comparison between the level of the synchronizing signal and a standard reference level 21 shows a difference. Since the attenuation behavior of the synchronizing signals resembles the damping behavior of the information signals, as already mentioned above, a simple automatic gain control is achieved. FIG. 6k represents the signal mixture transmitted from amplifier 19 during the above-mentioned hypothetical cycles of operation.

Figure 2:
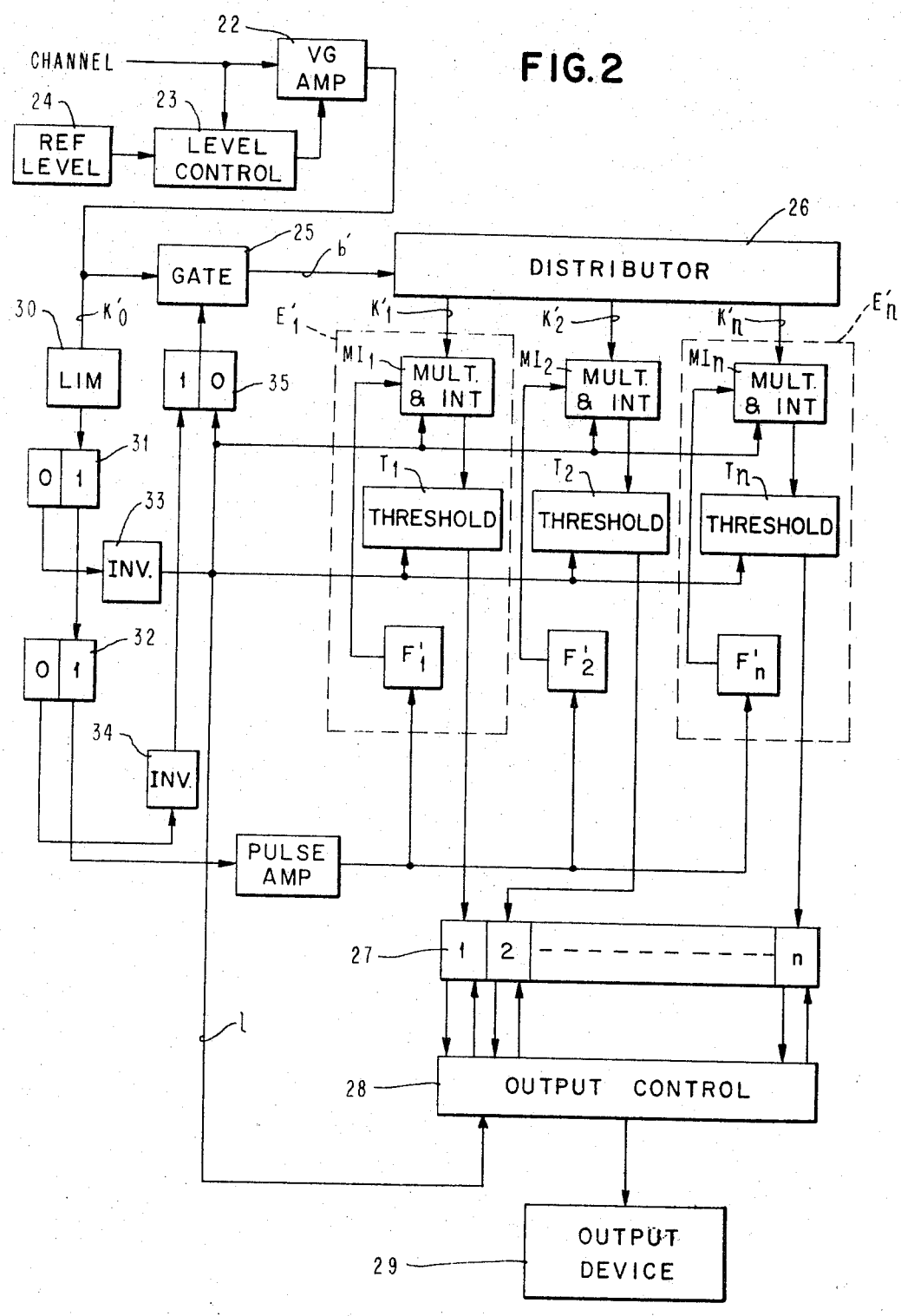
FIG. 2 shows a block diagram of the circuit arrangements at the receiving side.
Figure 7:
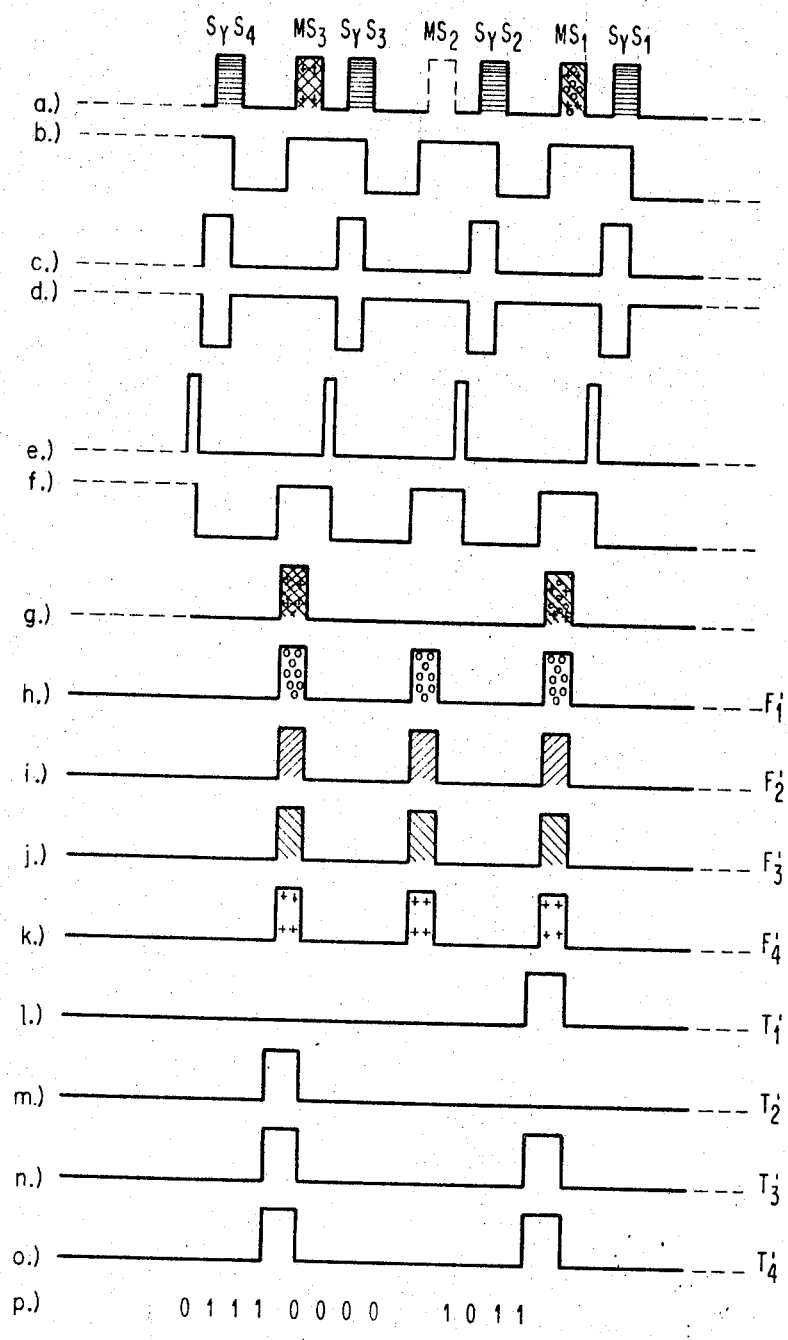
FIG. 7 shows timing diagrams for explaining the operation of the circuit in FIG. 2.

FIG. 2 shows a block diagram of the receiving circuit. The received signals represented by FIG. 7a are applied to variable gain input amplifier 22 which is followed by gate circuit 25 and distributor 26 in which the incoming signal is passed to $n$ parallel channels $K'_1$ to $K'_n$ under control of gate circuit 25. Each of these channels $K'_1$ to $K'_n$ leads to an evaluating circuit $E'_1$ to $E'_n$ comprising a multiplying and integrating amplifier $MI'_i$, a threshold circuit $T'_i$ and a filter $F'_i$.

The filters $F'_1$ to $F'_n$ at the receiving side are functionally identical to the filters $F_1$ to $F_n$ at the transmitting side so that the waveforms which they produce in response to a unit impulse are identical to the waveforms similarly produced at the transmitting side. These waveforms are schematically represented in FIGS. 7h to 7k. Each of the multiplying and integrating amplifiers may comprise an amplifier element having two inputs and an integrating element at its output. The received composite information signals passing over the channels $K'_i$ are delivered to each multiplying and integrating amplifier $MI'_i$ via one input, and the waveform from the associated filter $F'_i$ is delivered via the other input.

Because of the orthogonality properties of the waveforms employed each particular multiplying and integrating amplifier $MI'_i$ will produce an output of a significant level only if one of the component waveforms of the received composite signal is identical to the waveform produced by the filter $F'_i$ associated with that particular multiplying and integrating amplifier $MI'_i$. If the waveform of the associated filter $F'_i$ is not represented in the received composite signal, the output of the particular multiplying and integrating amplifier $MI'_i$ will be close to zero.

The outputs of the multiplying and integrating amplifiers $MI'_1$ to $MI'_n$ are monitored by bistable threshold circuits $T'_1$ to $T'_n$. If the output of the multiplying and integrating amplifier $MI'_i$ exceeds a preset threshold level, the threshold circuit is set and a binary "1" is transferred to the appropriate position of output register 27. If the output of the multiplying and integrating amplifier $MI'_i$ does not reach the threshold level, the threshold device $T'_i$ will not be set and a binary "0" will be transferred to the appropriate position of the output register 27.

The precise levels to which the threshold devices $T'_1$ to $T'_n$ should be set must be determined by practical experience in view of the actual operating environment and characteristics of each data transmission system. If the threshold levels are set too high the presence of some waveforms will remain undetected. If too low, spurious outputs may result from random factors.

FIGS. 7l to 7o show the outputs of the threshold circuits $T'_1$ to $T'_4$ during the three hypothetical cycles of operation. FIG. 7p shows the corresponding contents of output register 27. Information is transmitted from output register 27 to output device 29 under control of output control 28.

Important conditions for satisfactory operation of the receiver are effective synchronization and level control. With regard to level control, the technique employed at the receiver is much the same as that used at the transmitting side. At the receiving side, the level of the incoming synchronizing waveform is compared with a standard reference level 24. The level control 23 reacts to differences lying outside a given tolerance, by producing a control signal by which the variable gain input amplifier 22 may be set to an almost constant gain for the duration of the group of message signal waveforms succeeding the synchronizing waveform. During the next arriving synchronizing waveform, for example, $S_yS_2$, which separates the adjacent groups of message signals $MS_1$ and $MS_2$ from each other as shown in FIG. 7a, a new comparison is made between the level of this synchronizing waveform $S_yS_2$ and the reference level 24, whereupon regulation of the variable gain amplifier 22 is readjusted, if a deviation from the level of the former synchronizing waveform $S_yS_1$ has been established. The gain thereby set into the amplifier remains operative for the reception of the next group of signals $MS_2$.

For the purpose of the synchronization of the receiver, the synchronizing waveforms are branched off at the output of amplifier 22, via channel $K'_0$ to a limiter 30 which fulfills the same function as the limiter 15 at the transmitting side shown in FIG. 1 and therefore has the task of rectifying and limiting the synchronizing signals to a level suitable for input to the succeeding monostable multivibrator 31. The multivibrator 31 is driven into its "1" state by each incoming synchronizing signal as shown in FIG. 7b. The relaxation period of multivibrator 31 is so timed that, after the group of message signals associated with the synchronizing signal, has completely arrived, the multivibrator flips back into its "0" state.

When monostable multivibrator 31 swiches to its "1" state, one of the outputs drives monostable multivibrator 32 to its "1" state as shown in FIG. 7c. On the one hand the output from multivibrator 32 drives pulse amplifier 41 which produces unit impulses, shown in FIG. 7e, for triggering the characteristic responses of filters $F'_1$ to $F'_n$. On the other hand the output of monostable multivibrator 32 operates through inverter 34 to switch bistable circuit 35 to its "1" state as shown in FIGS. 7d and 7f. Gate 25 opens in response to the "1" state of circuit 35 so as to allow the message signals $MS_i$ to pass to the distributor while excluding the synchronizing signals $S_yS_i$. The processing of the message signals $MS_i$ is then carried out by means of evaluation circuits $E'_1$ to $E'_n$ in the manner previously described.

After the processing of each composite message signal the multiplying and integrating amplifiers $MI'_1$ to $MI'_n$, the threshold devices $T'_1$ to $T'_n$, and the output register 27 must be reset or erased so that the next composite message signal can be accurately processed. This function is carried out by means of reset pulses derived from the "0" state of multivibrator by means of inverter 33. The output from inverter 33 also serves to switch bistable circuit 35 to its "0" state so as to prevent the subsequent synchronizing signal from passing through gate 25 to distributor 36.

Although the foregoing description of FIGS. 1 and 2 sets forth a multiplex data transmission system employing a separate filter for each orthogonal transmission waveform, it will be apparent to those skilled in the art that the waveform generator circuit of FIG. 5 may readily be substituted for the sets of individual filters both at the transmitting side and the receiving side.

Figure 8:
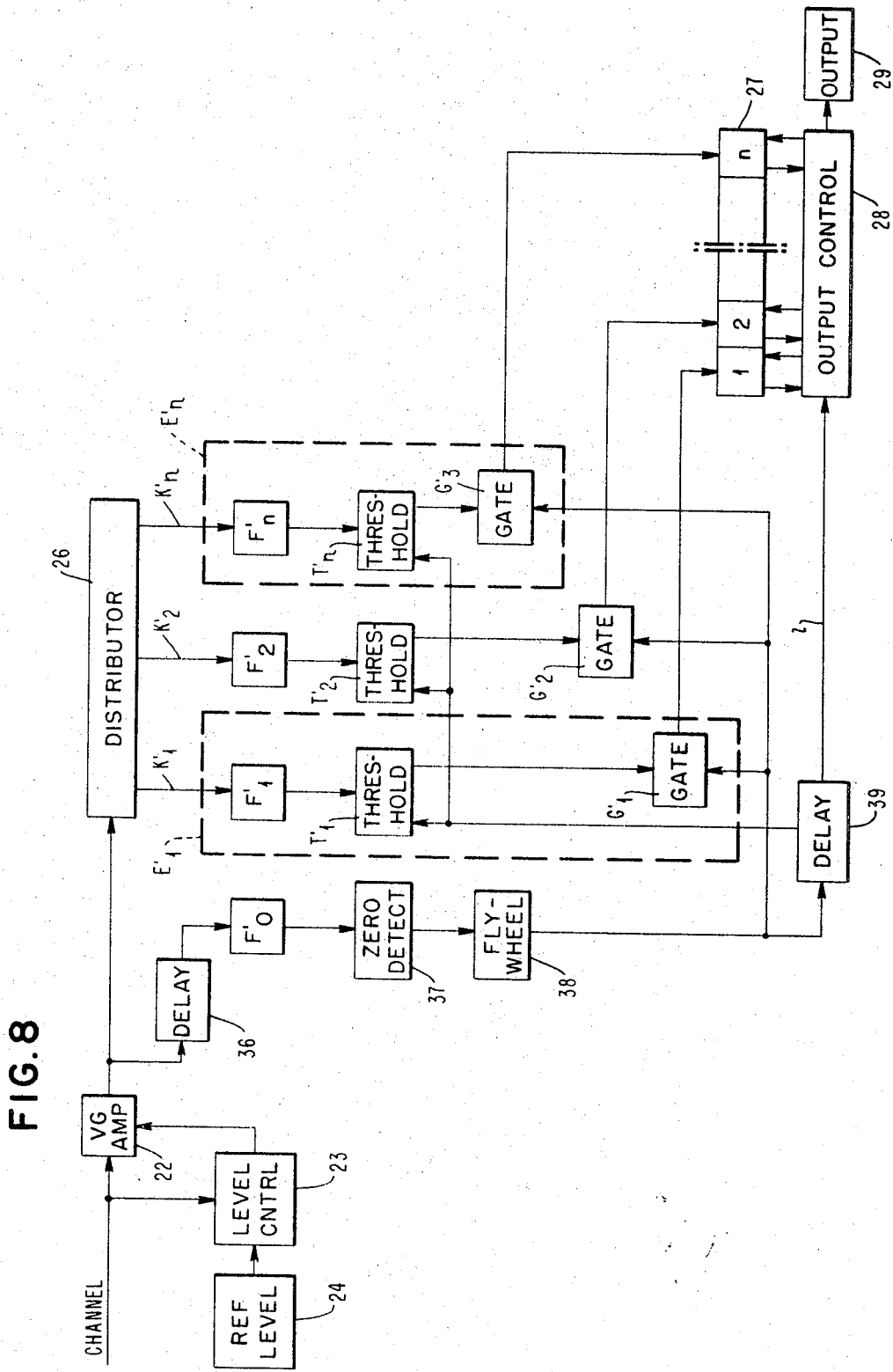
FIG. 8 shows a block diagram of an alternate circuit arrangement at the receiving side.

In the alternate form of receiver shown in FIG. 8, the orthogonality properties of the analog transmission waveforms are exploited in a slightly different manner in order to recover the transmitted message. If, for example, the waveform applied to one of the filters $F'_0$ to $F'_n$ of FIG. 8 was produced by the matching filter at the transmitting side, the filter output will exceed a certain threshold level, at a certain time $T_0$. If on the other hand another orthogonal waveform is applied to the input of the same filter, the filter output will have a zero transit at time $T_0$. By reason of these differing values of the filter output level at time $T_0$, it is possible for the waveforms which are linearly superimposed at the transmitting side, to be separated again at the receiving side. Expressed mathematically the operation of the receiver of FIG. 8 depends upon the following property of orthogonal waveforms:

(2) $$\int_0^t F_x(\tau) \cdot Fy(t-\tau)d\tau = b \text{ for } x=y$$
$$0 \text{ for } x \pm y$$

where $b$ may be equal to 1, if $F_{x \pm y}(t)$ is normalized.

Figure 9:
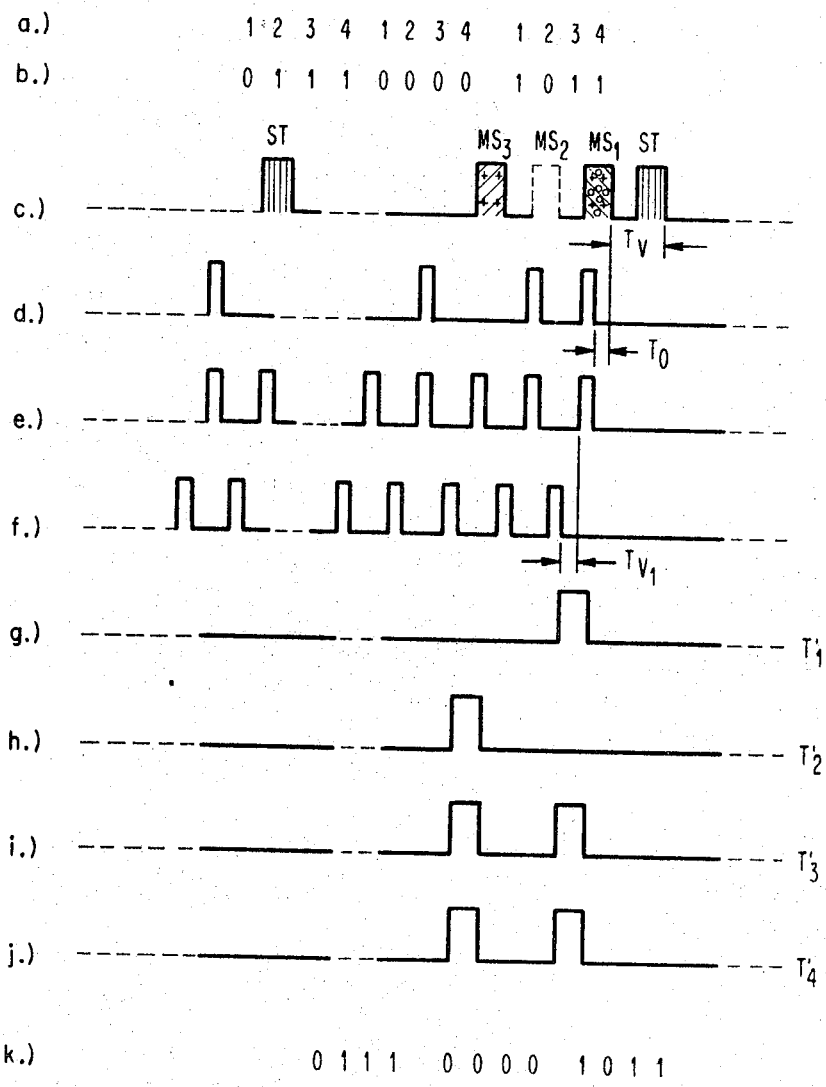
FIG. 9 shows timing diagrams for explaining the operation of the circuit in FIG. 8.

Referring to the block diagram of FIG. 8 and the associated timing diagrams of FIG. 9, the received signals represented by FIG. 9c are applied to the input variable gain amplifier 22, the gain of which is controlled by a control signal obtained in the same manner as in the circuit of FIG. 2.

It is noted that the composite message signals represented by $MS_1$, $MS_2$, and $MS_3$ shown in FIG. 9c are preceded by a start signal ST. This start signal ST is required by the characteristics of the receiver shown in FIG. 8 and serves to prime the receiver after each pause in the transmission of data so that subsequently transmitted information is processed correctly. The start signal ST may be supplied, for example, by releasing one or more transmission waveforms from the transmitting side immediately before transmitting the actual message-bearing waveforms $MS_i$. The message waveforms $MS_1$ follow the start signal at regular intervals under control of input control 12 of FIG. 1. It is noted that the operation of the receiver of FIG. 8 does not require the use of a synchronizing signal preceding each individual composite message signal.

The output from amplifier 22 is applied to distributor 26 which has $n$ output channels $K'_1$ to $K'_n$ which lead to evaluation circuits $E'_1$ to $E'_n$ each of which comprises a filter $F'_1$, a threshold device $T'_1$ and a gate $G'_1$. The outputs from evaluation circuits $E'_1$ to $E'_n$, shown for example in FIGS. 9g to 9j, feed output register 27, output control 28, and output device 29 in the manner described with respect to the receiver of FIG. 2.

The output of amplifier 22 is also applied to delay 36 which delays the signals by time $T_v$ which is equal to one message interval as shown in FIG. 9c. The output from delay 36 is applied to filter $F'_0$. Because the matching waveform is not present in the start signal ST, the output of filter $F'_0$ will have a zero crossing at time $T_0$. Further, the output of filter $F'_0$ will have such a zero crossing in response to each succeeding composite message signal $MS_1$ which does not contain the matching waveform. These zero crossings are detected by zero crossing detector 37 which produces output pulses in response thereto as shown in FIG. 9d. The output of zero crossing detector 37 is applied to flywheel circuit 38 which produces, as shown in FIG. 9e, a continuous sequence of pulses at its output even when certain individual pulses are missing from the sequence applied to its input.

The output from flywheel circuit 38 serves to interrogate the gates $G'_1$ to $G'_n$ at the moments $T_0$ during the evaluation of each successive message signal $MS_1$ when the characteristic threshold level or zero crossing is expected to occur. The overall delay of the circuits 36, $F'_0$, 37, and 38 is such that the first pulse of the output sequence from flywheel circuit 38 will arrive at the gate circuits $G'_1$ to $G'_n$ at the moment $T_0$ during the evaluation of the first composite message signal $MS_1$.

The output from the flywheel circuit 38 is applied to delay 39 in order to produce a series of pulses, as shown in FIG. 9f, for resetting threshold circuits $T'_1$ to $T'_n$ and clearing output register 27 after the processing of each composite message signal in order to prepare for the processing of the next succeeding message signal.

Although the multiplex data transmission system of my invention requires very little channel bandwidth, it may be desirable under some circumstances to compensate for small distortions in the orthogonality properties of the transmission waveforms. For this purpose the filters at the receiving side may have slightly different characteristics from the filters at the transmitting side. Also, where the transmission properties of the channel fluctuate with respect to time it may be desirable to match the filters to the mean fluctuation of the channel.

While the invention has been particularly described with reference to particular embodiments, it will be understood by those skilled in the art that changes in form and details may be made therein without departing from the spirit of the invention.

What I claim is:

1. A multiplex data transmission system wherein each data channel is represented by a characteristic orthogonal transmission waveform, including a transmitter, a transmission channel, and a receiver, said transmitter comprising:

an input register for accepting and temporarily storing data to be transmitted;

means connected to said input register for generating a synchronizing signal in response to the data stored in said input register for transmission over said transmission channel;

an impulse generator for generating a unit impulse in response to said synchronizing signal;

filter means connected to said impulse generator for producing a set of orthogonal transmission waveforms in response to said unit impulse;

a plurality of gates connected to said filter means for digitally modulating a combination of said orthogonal transmission waveforms under control of the data stored in said input register; and summation means for linearly superimposing the combination of orthogonal transmission waveforms digitally modulated by said gates so as to form a composite waveform for transmission over said transmission channel subsequent to the transmission of said synchronizing signal;

said receiver comprising:

means for producing a unit impulse in response to said synchronizing signal;

received filter means for producing a set of orthogonal waveforms in response to said unit impulse, said orthogonal waveforms corresponding to the orthogonal transmission waveforms produced at said transmitter;

a plurality of multipliers for multiplying the composite waveform from said transmission channel with each orthogonal waveform produced by said receiver filter means;

a plurality of integrators for integrating the outputs from said multipliers;

a plurality of bistable threshold devices for indicating whether the output levels of said integrators exceed a certain threshold level; and an output register connected to said threshold devices for recovering the transmitted data.

2. A multiplex data transmission system of the type described in claim 1, wherein said filter means and said receiver filter means each comprise:

a filter for producing a characteristic waveform in response to a unit impulse;

a plurality of differentiating means; and a plurality of adding means, said differentiating means and said adding means being interconnected so as to produce a set of orthogonal transmission waveforms composed of derivatives and sums of derivatives of the characteristic waveform produced by said filter.

3. A multiplex data transmission system of the type described in claim 1 wherein said synchronizing signal comprises a waveform orthogonal to said transmission waveforms.

References Cited

UNITED STATES PATENTS

| 1,315,539 | 9/1919 | Carson | 328—164 |
| 2,719,189 | 9/1955 | Bennett et al. | 179—15 |
| 3,204,034 | 8/1965 | Ballard et al. | 179—15 |
| 3,204,035 | 8/1965 | Ballard et al. | 179—15 |
| 3,384,715 | 5/1968 | Higuchi et al. | 179—15 |

ROBERT L. GRIFFIN, *Primary Examiner.*

CARL R. VONHELLENS, *Assistant Examiner.*

U.S. Cl. X.R.

325—39